(12) United States Patent
Krumböck et al.

(10) Patent No.: US 12,226,943 B2
(45) Date of Patent: Feb. 18, 2025

(54) ELECTRONIC ASSISTANCE FOR CUTTING PROFILE SAMPLES TO LENGTH, WITH THE EXTRUSION AND TEST PARAMETERS BEING ACCURATELY ASSIGNED

(71) Applicant: Extrunet GmbH, Eberstalzell (AT)

(72) Inventors: Erwin Krumböck, Ansfelden (AT); Siegfried Pramberger, Vorchdorf (AT)

(73) Assignee: Extrunet GmbH, Eberstalzell (AT)

( * ) Notice: Subject to any disclaimer, the term of this patent is extended or adjusted under 35 U.S.C. 154(b) by 401 days.

(21) Appl. No.: 17/326,729

(22) Filed: May 21, 2021

(65) Prior Publication Data

US 2021/0362392 A1 Nov. 25, 2021

(30) Foreign Application Priority Data

May 25, 2020 (AT) .............................. A 60163/2020

(51) Int. Cl.
| | |
|---|---|
| B29C 48/00 | (2019.01) |
| B29C 48/09 | (2019.01) |
| B29C 48/12 | (2019.01) |
| B29C 48/88 | (2019.01) |
| B29C 48/90 | (2019.01) |
| B29C 48/92 | (2019.01) |
| G09F 3/00 | (2006.01) |
| G09F 3/02 | (2006.01) |

(52) U.S. Cl.
CPC ...... *B29C 48/0022* (2019.02); *B29C 48/0023* (2019.02); *G09F 3/0295* (2013.01); *B29C 48/09* (2019.02); *B29C 48/12* (2019.02); *B29C 48/90* (2019.02); *B29C 48/9115* (2019.02); *B29C 48/92* (2019.02); *G09F 2003/0208* (2013.01)

(58) Field of Classification Search
CPC . B29C 48/0022; B29C 48/0023; B29C 48/09; B29C 48/9115; B29C 48/90
See application file for complete search history.

(56) References Cited

U.S. PATENT DOCUMENTS 5,427,316 A * 6/1995 Leone ..................... B29C 48/07 D7/300.2
6,840,748 B2 * 1/2005 Gasselseder ............ B29C 48/09 425/325

(Continued)

FOREIGN PATENT DOCUMENTS

DE 202019005329 U 4/2020
EP 1995073 A2 * 11/2008 ......... B29C 47/0023

(Continued)

*Primary Examiner* — Seyed Masoud Malekzadeh
(74) *Attorney, Agent, or Firm* — Dykema Gossett PLLC

(57) ABSTRACT

Various embodiments of the present disclosure are directed to methods and systems for producing plastic profiles. In one example embodiment, a method is disclosed including the steps of plasticizing a starting material in an extruder on an extrusion line, pressing the starting material through an extrusion die, cooling and calibrating the extruded material in a dry calibration and/or a wet calibration, and cutting the extruded material to length to form individual profile rods, cutting to length one or more profile samples can be requested intermittently at any point in time, applying, via a labeling device, on the profile samples characteristic information relating to the current extrusion process, taking into account the transit time of the profile.

11 Claims, 1 Drawing Sheet

(56) References Cited

U.S. PATENT DOCUMENTS

| | | | |
|---|---|---|---|
| 2005/0017388 A1* | 1/2005 | Jirka | B29C 48/903 |
| | | | 425/135 |
| 2010/0126974 A1* | 5/2010 | Kertscher | A01G 25/02 |
| | | | 219/121.71 |
| 2010/0133718 A1* | 6/2010 | Arkenau-Maric | B29C 48/12 |
| | | | 425/142 |
| 2019/0016036 A1* | 1/2019 | Krause | B29C 48/0021 |
| 2019/0255753 A1* | 8/2019 | Pramberger | B29C 48/92 |

FOREIGN PATENT DOCUMENTS

| | | | | |
|---|---|---|---|---|
| EP | 3372380 A1 | * | 9/2018 | B29C 48/0022 |
| WO | WO-2018/071942 | * | 4/2018 | B29C 48/12 |
| WO | WO-2018071942 A1 | * | 4/2018 | B29C 48/12 |

* cited by examiner

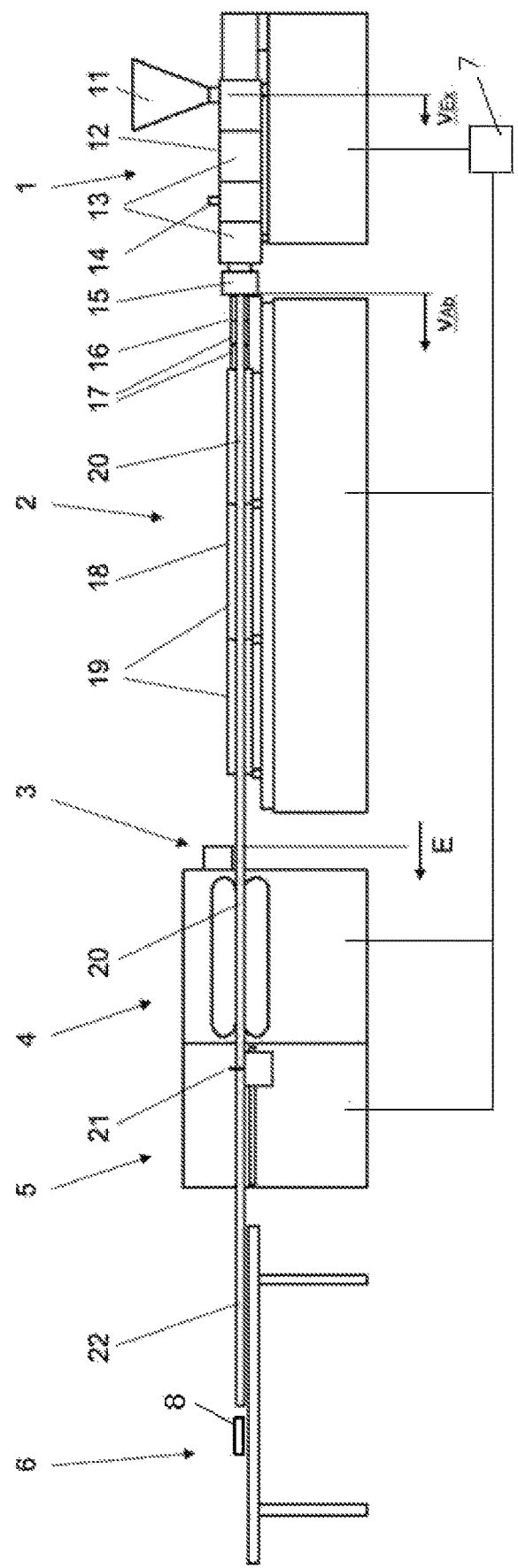

ELECTRONIC ASSISTANCE FOR CUTTING PROFILE SAMPLES TO LENGTH, WITH THE EXTRUSION AND TEST PARAMETERS BEING ACCURATELY ASSIGNED

CROSS-REFERENCE TO RELATED APPLICATIONS

This application claims the benefit of priority to Austria application No. A 60163/2020, filed 25 May 2020.

BACKGROUND

The present invention relates to a method for producing plastic profiles according to the preamble of claim 1.

On an extrusion line, a starting material is plasticized in an extruder and is pressed through an extrusion die, then is cooled and calibrated in a dry calibration and/or a wet calibration, and thereafter is cut to length to form individual profile rods, wherein a labeling device is included in the extrusion line.

Operating an extrusion line in which profiles are produced, for example for manufacturing doors and windows, is a technically very demanding task. Many parameters have to be monitored and adjusted in order to ensure the quality of the profile. This task is also made more difficult by the fact that many different profiles are produced in the production plant, and the settings for each of these variants are usually different. It cannot necessarily be assumed that a constellation of these parameters for a given profile, once determined as favourable, can be left unchanged for relatively long periods of time, since adjustments are always necessary due to wear and tear on tools and changes in environmental conditions.

Therefore, during the ongoing extrusion of window profiles, it is customary for a number of profile samples to be taken at particular time intervals, which samples are then subjected to various tests in order to ensure compliance with the required quality parameters, for example according to the RAL quality guidelines. These tests concern the dimensional accuracy, colour, surface gloss, shrinkage, ball drop test, etc. It is advantageous to clearly log and store not only the quality parameters of the profile samples, but also the extrusion parameters which cover the exact time frame in which the profile sample was extruded. This applies to the setting data and also to the associated actual values for the extruder and the downstream extrusion line (extruder speed, cylinder and die temperatures, take-off speed, negative pressure in the dry calibrators and in the vacuum tanks, cooling water temperatures, cooling water throughput, etc.) and measured parameters (mass throughput, screw torque, mass temperature, various pressures in the cylinder and in the extrusion die, various temperatures, etc.). This data can later be analysed in detail if necessary so that, if unusual deviations occur, the causes can be determined and long-term trends can be identified. The most important of these values have in the past been recorded by the operating personnel and noted on a log sheet. Now, all setting parameters, associated actual values and additionally also many further measured values are recorded as a matter of routine and continuously stored, so as to be able to find possible causes retroactively in the event of faults.

When starting up the extrusion line, it is necessary that the operators set or readjust all setting parameters based on previously proven settings so that the required quality parameters of the profile are rapidly achieved and maintained and a changeover to ongoing production can be made at an early stage. The extrusion line is controlled at a control panel, which is usually arranged in the die area of the extruder. In the transition area between the die and the calibration, at the point where the melt emerges from the die and enters the dry calibration, there is a critical area which requires special attention when starting up the extrusion line and optimizing the setting parameters. Depending on the progress made when starting up the extrusion line, which will not be discussed in detail here, setting data are input at the control panel and are continuously adapted. In practice, it takes around one hour until all the hollow chambers of the profile are formed and the profile bears against all the calibrating elements, so that the profile geometry is largely formed.

Depending on the experience of the team concerned, it will take around a further half hour until a profile that meets the tolerances and complies with the quality parameters can be expected. As soon as this state is reached, profiles are produced in the course of ongoing extrusion. Until then, large quantities of scrap will be produced.

The profile currently emerging from the die passes through, at the take-off speed, the dry and wet calibration and then the caterpillar take-off, and after a few minutes it reaches the cutting device (saw or cutter). Here, the profile rods or the profile samples are cut off so as ultimately to land on the deposit table and reside thereon for a short period of time. From this deposit table, the profile rods are either removed in a controlled manner and placed in a profile container or are discarded in an uncontrolled manner into a scrap container. It is important to clearly mark the profile samples even before they are cut to length so that, if multiple samples are present on the deposit table or in the scrap container, the profile samples can easily be distinguished and can be associated with their exact history.

A first measure for achieving improvements is to apply basic data, such as for example a production order number, to the profile created, so as to facilitate subsequent tracking. One such solution is described for example in DE 20 2019 005 329 U.

It is then also possible to establish a link to stored data by means of a time stamp applied to a profile sample, said stored data reflecting the various setting parameters over time. Relationships between the set values and the quality of the profile can therefore be derived. However, it has been found that the information obtained in this way is unreliable and inaccurate.

SUMMARY OF THE INVENTION

The object of the present invention is to provide improved data for quality assurance in order to enable easier and better compliance with the required quality. The aim is also to shorten the length of time within which a profile that meets the quality requirements can be produced in a stable manner when starting up the extrusion line.

According to the invention, these objects are achieved by the features of claim 1.

It is essential to the method according to the invention that the cutting to length of one or more profile samples can be requested intermittently at any point in time by way of a control device, wherein, on the profile samples, characteristic information relating to the current extrusion process is applied to the profile sample, taking into account the transit time of the profile.

A first aspect of the invention lies in the fact that it is easily possible for the operating team to produce a profile sample when required. Here, a profile sample denotes a profile section which is typically much shorter than the profile sections normally produced in the course of production, which have a length of 6 m. One such time at which a profile sample is produced is, for example, when a setting parameter is significantly changed and it is desired to document the effect of this change on the profile produced.

One concept essential to the invention is that such changes naturally do not have an immediate effect on the profile discharged at the end of the extrusion line. Before emerging from the die, the plastic has already passed through the filling hopper and the extruder. In the extruder, the dry blend is processed to form a melt. The speed at which the dry blend or the melt passes through the extruder in the extrusion direction is determined by the throughput, the geometry of the screws and the screw speed and is approximately proportional to the screw speed. Each length section of the extruder must be assigned certain extrusion parameters (cylinder heating zones, screw temperature control, torque, etc.).

If, for example, the composition of the granules fed to the extruder is changed, then a change may not be seen on the product until the average residence time of the material in the extruder and additionally the time taken for the profile strand to pass from the extrusion die, through the calibration tools, to the labeling device has elapsed. This labeling device is typically arranged between the caterpillar take-off and the saw or cutter. This transit time, also referred to as the latency time, must therefore be taken into account so that the profile sample is produced only once the change may have affected the profile produced, that is to say after the latency time has elapsed.

However, it is particularly important that the relevant information is also correctly noted on the profile sample. When it comes to the composition of the raw material, therefore, information must be applied about the composition that has been fed in at a point in time situated before the point in time at which the information is applied, said times differing by the latency time, which in this case is the sum of the average residence time of the material in the extruder and the transit time of the profile strand from the extrusion die to the labeling device.

If, for example, the vacuum pressure in a calibration tool is changed, then the latency time taken into account must be the transit time from this tool to the labeling device.

With regard to the way in which the information is applied, various possibilities are available. For example, the information may be printed directly onto the profile strand, for example using an inkjet printer or laser printer. However, it is also possible to use adhesive labels, or other means, in order to provide the profile samples with the appropriate information.

According to a first preferred embodiment variant of the present invention, the information itself may be applied in plain text, that is to say that the relevant details are applied in the form of numbers or tables. This is particularly useful when starting up an extrusion line, since the operating personnel immediately have the possibility of reading the relevant data from profile samples without requiring special reading devices, computers or the like. However, due to the space available, it is not possible to note data in plain text on the profile sample without limitation.

A lot of coordination is required in order to assign the exact extrusion parameters to each profile sample, especially since different extrusion parameters are adjusted within short time intervals during the start-up phase. In addition, the profile samples should be removed and labeled immediately after being cut, so as to avoid confusion with other samples that have been cut within short time intervals. Particularly when starting up the extrusion line, multiple operators are required in order to optimize the extrusion parameters in a targeted manner based on profile samples and to provide meaningful profile samples. If there is confusion between samples, changes derived therefrom which are made to various parameters with a view to optimizing the profile geometry could lead to a worse result or may even lead to a profile break, but in any case the start-up process will be extended. This risk can be significantly reduced by this embodiment variant of the invention.

According to another preferred embodiment variant of the present invention, therefore, only a code is applied to the profile sample as information, wherein at the same time a data set associated with the code is created and stored, said data set containing all the relevant data reflecting the settings and parameter values relevant to the profile sample. This code may be, for example, a QR code.

In modern extrusion lines, following a general trend towards automating production, more and more extrusion parameters are being continuously recorded and stored. These values can also be associated with the profile samples without any significant additional effort. Since the continuously recorded extrusion parameters are usually deleted from the production perspective after days or weeks, it is advisable to store the data for the profile samples in a separate database, which is attached to quality assurance for example. Both departments can thus retain, manage or delete data at their sole discretion.

It is thus possible to take the required profile samples at the earliest useful point in time without much effort from the operating personnel, and to log the associated extrusion and quality parameters in a manner safe from confusion and make these available for subsequent evaluations.

If a signal is given to take a profile sample, then the earliest useful point in time for taking the profile sample is usually immediately after one complete profile rod has been cut to length. This prevents incomplete rods from being produced, which represent waste and often also have to be manually removed from the production line. It is also advantageous if the control device checks whether extrusion parameters have been changed, either by the operator or as a result of a disturbance, in the time close to when the sample in question has passed through. If a relevant change is detected, this change should be made known to the operator, as well as the time interval at which a profile sample without foreseeable impairment can be expected to be taken. The operator can then decide whether or not the sample should be taken later. In order to be able to check even in retrospect that no relevant changes to individual extrusion parameters have taken place, intentionally or unintentionally, while the profile sample was passing through, all the recorded values throughout the entire transit time of the profile sample should be stored, so as to be able to be precisely evaluated even in retrospect if required.

As an additional measure, it is proposed to store for each profile sample not only the respective relevant data, taking into account the transit time, but also all electronically recorded extrusion parameters (setting parameters of extruder, tool and downstream line, associated actual values, and all other recorded measured values) in a certain time range before and after. Within this time period of around 10 min to 15 min in total, a check can subsequently be made at any time as to whether a "stationary state" existed for each extrusion parameter. If not, the deviations or effects compared to the expected target state can be estimated. In particular, care can be taken to determine the exact time at which the profile sample in question, or the associated melt, passed through which zone or measuring point.

It is advantageous to combine the two measures described above, that is to say that information in plain text is applied, as well as a code which refers to all other recorded data (clear characterization of the extrusion line and tool used, all extrusion parameters, etc.), which are stored in a database. The latter data can be accessed using the code. In addition, test values (geometry, mechanical test values, colour values, etc.) subsequently determined on the profile samples should be able to be specifically assigned to the test samples in question and should therefore be stored under the same test sample code.

It is advantageous to combine the software for the control device for taking the profile sample, for actuating the labeling device and for reading the extrusion parameters in the appropriate time window in a separate software module, and to integrate the latter into the control device of the downstream line.

For instance, the following overview data should be indicated in plain text on the profile sample:
- date and time of printing;
- extrusion line identifier (number);
- tool identifier (number);
- consecutive numbering of the sample, starting daily with 1 (or starting number can be defined);
- supplementing the number with a, b, c, . . . , if multiple samples are taken immediately after one another;
- a brief comment (for example purpose of the profile sample, setting parameter last changed, for RAL testing, or the like . . . );
- arrow to indicate the extrusion direction;
- most important extrusion parameters (for example extruder speed and take-off speed, mass throughput, melt pressure, melt temperature, screw torque, vacuum settings of dry calibration and vacuum tanks);
- supplementary parameters of choice;
- profile sample code for retrieving all recorded and stored extrusion parameters and associated test values.

The invention also relates to an apparatus for producing plastic profiles according to claim 9.

BRIEF DESCRIPTION OF THE DRAWING

The present invention will be explained below with reference to an exemplary embodiment which is shown in a schematic drawing. The FIGURE shows, based on an extrusion line, the process for the requesting of one or more profile samples 8 by an operator, and subsequently the automatic cutting and labeling of these profile samples 8.

DETAILED DESCRIPTION

FIG. 1 shows the basic structure of an extrusion line for producing window profiles. However, the invention is not limited to window profiles, but rather can also be used in the case of extrusion lines for pipes, technical profiles and the like. In the extruder 1, the melt is prepared from the dry blend. The dry blend is fed to the extruder through the hopper 11. The screws convey the plastic material from left to right through the extruder, with energy being supplied via the screws and the heated cylinder 12, here equipped with four cylinder heating zones 13, wherein the melt is intensively mixed and heated to a temperature of around 195° C. In parallel with the heating, the melt is brought to a pressure of approx. 350 bar and is thus pressed through the extrusion die 15. At the degassing opening 14, gaseous components of the formulation (water vapour due to the moisture content of the dry blend, entrained air, and gases given off from the formulation as a result of heating) are extracted. The conveying speed $v_{Ex}$ in the extrusion direction E depends mainly on the throughput, the screw geometry and the screw speed. The conveying speed $V_{EX}$ is variable over the length of the extruder, and it is characteristic for each type of extruder. The throughput is approximately proportional to the screw speed. In other words, to ensure a desired throughput, a certain screw speed must be set, as a result of which a characteristic transit speed and residence time of the dry blend or melt in the extruder, from leaving the filling hopper 11 to emerging from the die 15, can be determined.

Located after the extruder is the calibration table 2, on which a dry calibration 16 and a wet calibration 18 are mounted. After the melt emerges from the extrusion die 15, it enters the dry calibration 16, here consisting of three dry calibrators 17. The melt, which is still hot, corresponds approximately to the profile contour and is sucked against the calibrator wall by negative pressure and is thus cooled externally. For further cooling, the profile 20 passes through some vacuum tanks 18. Located therein, at intervals of 100 mm to 300 mm, are numerous plates which support the profile against the negative pressure in the vacuum tanks. By direct contact of the profile 20 with cooled water, the profile is largely cooled. Wet calibration lengths of up to approx. 18 m are customary, depending on the take-off speed $v_{Ab}$, the outer wall thicknesses of the profile and the number of inner walls.

The caterpillar take-off 4 serves to transport the profile through the calibration. The profile 20, which has already been cooled, is clamped between two caterpillars and conveyed in the extrusion direction at the take-off speed $v_{Ab}$, wherein typically take-off forces of around 3 kN to 10 kN occur.

In the subsequent cutting device 5, here configured as a saw 21, the profile 20 is cut to length to form profile rods 22, which usually have a length of 6 m. During the sawing process, the cutting unit 21 is moved in synchronism with the take-off speed. The profile rods 22 that have been cut to length are pushed onwards by the profile 20 until they reach the deposit table 6, and are displaced transversely in the latter. Profile rods which meet the quality requirements are moved manually or by a mechanical device into profile containers; profiles which do not meet the quality requirements enter a scrap container.

After emerging from the extrusion die 15, the profile 20 moves at the take-off speed $v_{Ab}$ through the entire downstream line until it reaches the cutting unit 21. During ongoing profile extrusion, usually even when producing scrap or during the start-up process, profile rods of predefined length are cut. The control device "always knows" the times at which a cutting process is to be activated. This applies also to manually triggered cutting processes and even in the event of changes in the take-off speed and/or the extruder speed.

In order to be able to reflect as accurately as possible, when analysing the extrusion process, the "history" of a particular profile sample 8 from when the dry blend enters the extruder until the profile sample 8 is cut to length, the characteristic distances or length dimensions of the extruder, of the tool, of the downstream line and of the labeling device must be known in addition to the extrusion parameters (various setting data and measurement data). These data must be input once for the extrusion line and for the tool and are then available for each production batch of the relevant profile.

To cut one or more profile samples 8 to length, the machine operator first inputs a request signal. Further information is then exchanged in the dialogue with the control device:

number and lengths of the requested profile samples 8, which are to be taken one after the other;

time at which the sample(s) is/are to be taken:
  immediately=as soon as the profile sample 8 just printed arrives at the cutting unit;
  after the next complete profile rod 22 has been produced;
  after the melt currently emerging from the die 15 has passed through;
  after the dry blend currently being fed to the extruder 1 has passed through;
  after a time delay of x minutes;
  etc.;

entering the short comment to be printed.

As soon as a profile sample 8 has been requested, the control device is ready to determine the extrusion parameters and supplementary parameters to be printed on the profile sample 8 over a short period of time before the printing time, for example to calculate the mean values of the relevant measured values over 15 seconds shortly before printing.

As soon as this information is known, the control device 7 determines the time at which printing is to take place, taking into account the time offset between the labeling device 3 and the cutting position of the cutting unit 21. In other words, the profile sample 8 is first labeled (or a label is adhered thereto) at the corresponding profile position, so that the label subsequently appears at a short safety distance behind the first cut end face of the profile sample 8. It is advantageous that all the profile samples 8 that are cut immediately after one another have the same label as the one cut first.

In parallel with the labeling and cutting to length of the profile samples 8, the control device also determines the exact time frame over which the routinely recorded extrusion parameters (all digitally recorded setting parameters and measured values of the entire extrusion line) are to be assigned to the specific profile sample 8. The end point of the appropriate time frame is the time at which printing is to take place. The meaningful start of the time frame is the time at which the dry blend for producing the specific profile sample 8 has been fed to the extruder 1, preferably earlier than said time by a safety period of around 3 to 5 minutes. The duration of the time frame is calculated from the distance between the labeling device and the die 15 divided by the take-off speed plus the transit time through the extruder 1, which is approximately proportional to the screw speed. The duration of the time frame can therefore be defined automatically by the control device based on the known variables. A check of the correctness can occasionally be carried out by means of a colouring test of the dry blend.

It is advantageous to store and manage all the data that can be assigned to a particular profile sample 8 in a separate database, independent of the database in which all the recorded extrusion parameters are routinely stored. This also applies to the quality tests subsequently carried out on the test samples 8 (for example geometry measurements, mechanical test values, measured colour values, etc.). The "profile sample code" printed as standard on the profile samples 8 is provided for this purpose: All the data that are closely related to a particular profile sample 8 are stored under this code and can be analysed in retrospect with high accuracy. The extrusion parameters have much more significance if they can subsequently still be related to the quality of a retained profile sample 8.

The invention claimed is:

1. Method for producing plastic profiles including the following steps:
   on an extrusion line, a starting material is plasticized in an extruder,
   pressing the starting material through an extrusion die,
   cooling and calibrating a extruded material in a dry calibration and/or a wet calibration, and
   cutting the extruded material to length to form individual profile rods,
   cutting to length one or more profile samples intermittently at any point in time,
   applying, via a labelling device, on the profile samples characteristic information relating to a current extrusion process used to create the profile samples, wherein the characteristic information is generated by taking into account a transit time of the profile, wherein the transit time is the time it takes for the profile sample to travel from the extruder to the labelling device.

2. The method according to claim 1, wherein the characteristic information is applied to the profile samples by printing thereon or in a form of printed labels.

3. The method according to claim 1, wherein the one or more profile samples are produced immediately after a complete profile rod or after another profile sample.

4. The method according to claim 1, wherein the applied characteristic information is executed at least partially in plain text.

5. The method according to claim 1, wherein the applied characteristic information is coded and relates to a separately stored database.

6. The method according to claim 1, wherein latency times, which occur when changing extrusion parameters, are also accounted for with respect to the transit time of the profile.

7. The method according to claim 1, wherein the transit time of the profile also takes into account type of information to be applied to the profile samples.

8. The method according to claim 1, wherein the applied characteristic information includes one or more of the following: material compositions fed to the extruder, temperatures in the extrusion die, or pressures in calibration tools.

9. The method according to claim 1, wherein the applied characteristic information includes material compositions fed to the extruder.

10. The method according to claim 1, wherein the applied characteristic information includes temperatures in the extrusion die.

11. The method according to claim 1, wherein the applied characteristic information includes pressures in calibration tools.

* * * * *